(12) United States Patent
Mantell (10) Patent No.: US 7,719,718 B2
(45) Date of Patent: May 18, 2010

(54) THRESHOLD MODIFICATION FOR LIMIT CYCLE REMOVAL IN VECTOR ERROR DIFFUSION

(75) Inventor: David Allen Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 578 days.

(21) Appl. No.: 11/685,489

(22) Filed: Mar. 13, 2007

(65) Prior Publication Data

US 2008/0226188 A1 Sep. 18, 2008

(51) Int. Cl.
H04N 1/405 (2006.01)

(52) U.S. Cl. ...................... 358/3.03; 358/3.05

(58) Field of Classification Search ............... 358/1.9, 358/2.1, 3.03–3.05, 3.13–3.15; 382/251–253
See application file for complete search history.

(56) References Cited

U.S. PATENT DOCUMENTS

| | | | |
|---|---|---|---|
| 5,521,989 A | 5/1996 | Fan | |
| 5,621,546 A * | 4/1997 | Klassen et al. | 358/536 |
| 5,784,496 A * | 7/1998 | Mantell | 382/237 |
| 5,809,177 A | 9/1998 | Metcalfe et al. | |
| 6,014,233 A | 1/2000 | Fan et al. | |
| 6,563,957 B1 | 5/2003 | Li et al. | |
| 6,608,700 B1 | 8/2003 | Mantell | |
| 6,982,814 B1 | 1/2006 | Frazier et al. | |
| 2005/0134920 A1 | 6/2005 | Mantell | |
| 2005/0134921 A1 | 6/2005 | Mantell | |
| 2005/0135673 A1 | 6/2005 | Mantell | |
| 2005/0135674 A1 | 6/2005 | Mantell | |
| 2005/0157348 A1 | 7/2005 | He et al. | |
| 2005/0179916 A1 | 8/2005 | Mantell | |

OTHER PUBLICATIONS

Ti-chiun Chang et al., "Memory Efficient Error Diffusion", IEEE Transactions on Image Processing, vol. 12, No. 11, Nov. 2003, pp. 1352-1366.
Niranjan Damera-Venkata et al., "Adaptive Threshold Modulation for Error Diffusion Halftoning", IEEE Transactions on Image Processing, vol. 10, No. 1, Jan. 2001, pp. 104-116.
A.J. Magrath et al., "A Sigma-Delta Modulator Topology with High Linearity", IEEE International Symposium on Circuits and Systems, Jun. 9-12, 1997, Hong Kong, pp. 53-56.

* cited by examiner

Primary Examiner—Edward L Coles
Assistant Examiner—Stephen M Brinich
(74) Attorney, Agent, or Firm—Oliff & Berridge, PLC (57) ABSTRACT

A device and method is provided for breaking up undesirable patterns in vector error diffusion when the sum of inputs is near fraction values of the total input range. In the method, the value of the sum is calculated modulo the maximum input value. The mod value tendency to produce limit cycles is then determined for multiple planes in a manner similar to that for an individual plane. The threshold process for the vector calculation can then be modified to break up the cycles that occur in the combinations of the multiple colors. Typically, the largest of the individual plane modifications and the vector sum mod value is used for threshold modification. At least two different types of threshold modifications are possible: (1) random or psuedo-random noise address to the threshold; and (2) non-contiguous regions of threshold.

20 Claims, 7 Drawing Sheets

THRESHOLD MODIFICATION FOR LIMIT CYCLE REMOVAL IN VECTOR ERROR DIFFUSION

BACKGROUND

The exemplary embodiments generally relate to marking and imaging devices, architecture and document services, and specifically relate to vector error diffusion.

There are many methods of rendering gray images on an output device. One such example is error diffusion. Error diffusion can render complex images that contain a mixture of text and picture reasonably well. The utilization of error diffusion eliminates the need to have image segmentation to separate the text from the picture so that the picture aspect of the document can be screened and the text aspect of the document can be threshold.

Figure 1:
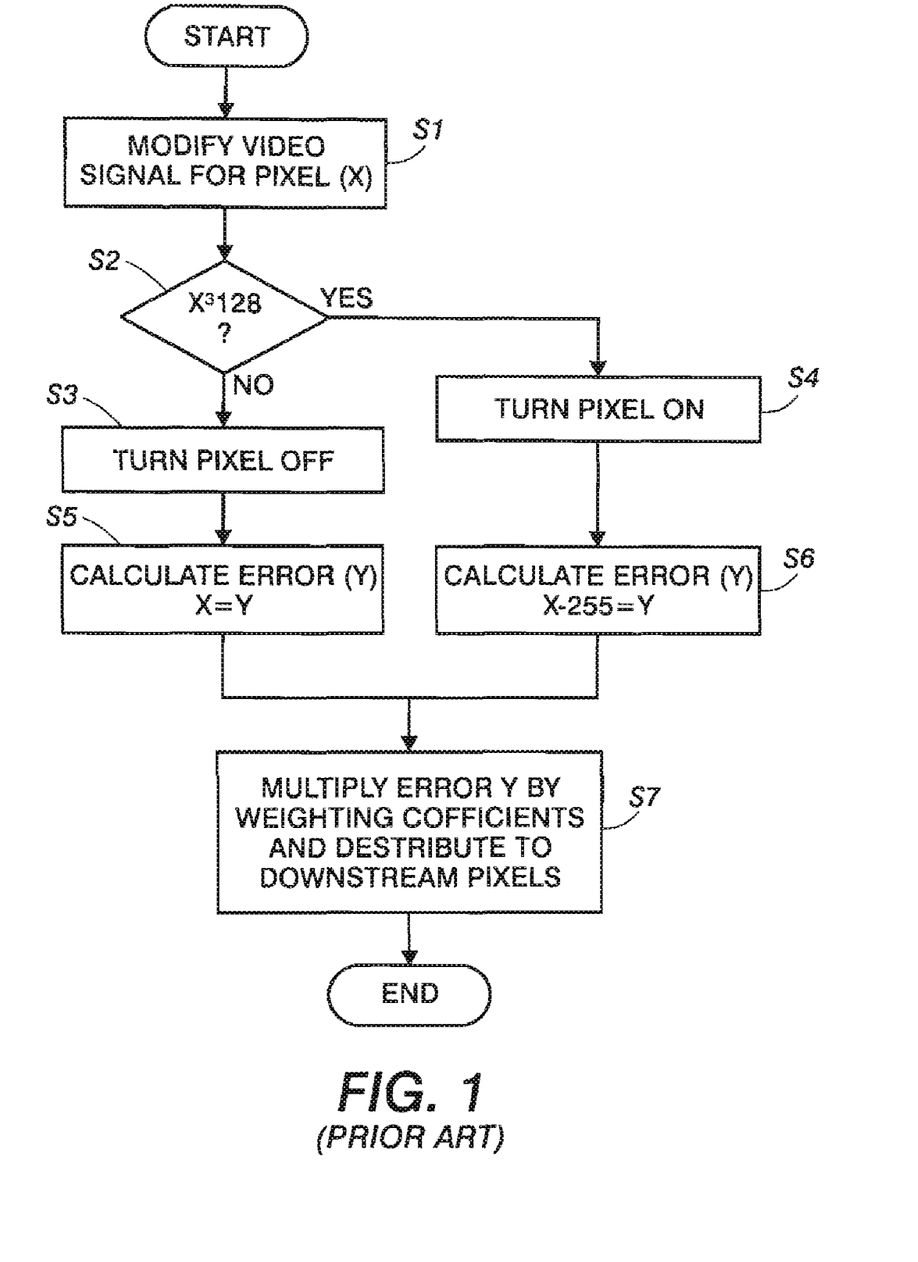
FIG. 1 illustrates a flowchart of a typical error diffusion process in the prior art.

Related error diffusion is described in U.S. Pat. No. 5,809,177 issued Sep. 15, 1998 to Metcalfe et al. FIG. 1 is a flowchart of a typical error diffusion binarization system. In Step S1 of this process, the video signal for pixel X is modified to include the accumulated error diffused to this pixel from previous threshold processes. The modified video signal value X is compared at Step S2 with the value 128, assuming a video range between 0 and 255. If Step S2 determines that the modified video signal value X is greater than or equal to 128, the process proceeds to Step S4 wherein a value is output to indicate the tuning ON of pixel X. The process then proceeds to calculate the error associated with the threshold process at Step S6 wherein this error, Y, is calculate as being X-255.

On the other hand, if Step S2 determines that the modified video signal value X is less than 128, a signal is output at Step S3 indicating that the pixel X is to be turned OFF. The process then proceeds to Step S5 wherein the error, Y, is calculated as being equal to the value X.

The error calculated in either Steps S5 or S6 is multiplied by weighting coefficients and distributed to downstream pixels in Step S7. Thus, the error from the threshold process is diffused to adjacent pixels.

Related approaches to error diffusion include noise methods, alternating weights, and deterministic bit flipping. U.S. Pat. Nos. 5,521,989 and 5,809,177 describe adding noise to the threshold so that it can be filtered by a scalar error diffuser to make its contribution to the output pixels predominantly high frequency or blue noise. Alternating weights is described in U.S. Pat. No. 6,608,700 issued Aug. 19, 2003 to Mantell, which distributes fractional weighted portions of an error to selected subsequent pixels. Deterministic bit flipping is described in A. Magrath and M. Sandler, "A Sigma-Delta Modulator Topology with High Linearity," IEEE International Symposium on Circuits and Systems, Jun. 9-12, 1997, Hong Kong. Deterministic Bit Flipping is applied to error diffusion in N. Damera-Venkata, IEEE Transactions of Image Processing, Vol. 10, No. 1, January 2001, and its advantages are discussed in T. Chang and J. Allebach, "Memory Efficient Error Diffusion," IEEE Transactions on Image Processing, Vol. 12, No. 11, November 2003.

SUMMARY

Related error diffusion such that as shown in FIG. 1 introduces correlated patterns as described in U.S. Pat. No. 5,521,989 issued May 28, 1996 by Fan. These correlated patterns, sometimes called "worms," appear in uniform image areas, particularly in shadow and highlight areas. Related approaches to error diffusion, such as using random weights or thresholds, add new artifacts or cause an increase in noise. Related error diffusion generates undesirable patterns for input levels that are near fractions of a total input range. These defects, called limit cycles, sometimes occur when the error diffusion produces multiple stable output patterns such that the output alternates between these stable output patterns over large scales. The exemplary embodiments address or obviate these issues.

One exemplary embodiment is a method of vector error diffusion. A sum of a plurality of inputs is calculated in vector error diffusion. It is determined whether the sum is at or near one of a set of fractions of a maximum input value tending to produce limit cycles and the threshold is modified to break up the limit cycles. The sum may be calculated modulo the maximum input value. The threshold may be modified using a largest of a plurality of individual plane modifications and the sum or a sum of a plurality of plane modifications. The threshold modification may be random or pseudo-random noise. The threshold modification may be performed using an algorithm that adjusts ranges of threshold values for which the output will take on specific values based on input image values. An example of such an algorithm is deterministic bit flipping. Another exemplary embodiment is a marking device that includes a memory for storing instructions for performing this method. Anther exemplary embodiment is a computer-readable medium for storing instructions for performing this method.

Another exemplary embodiment is a vector error diffuser, including an adder, a threshold comparator, and a threshold modifier. The adder calculates a sum of a plurality of inputs in vector error diffusion. The threshold comparator determines whether the sum is at or near one of a set of fractions of a maximum input value tending to produce limit cycles. The threshold modifier modifies a threshold to break up the limit cycles. The vector error diffuser may also include a modulo function for calculating the sum modulo the maximum input value and a lookup table to determine the threshold modification.

DETAILED DESCRIPTION OF EMBODIMENTS

Figure 2:
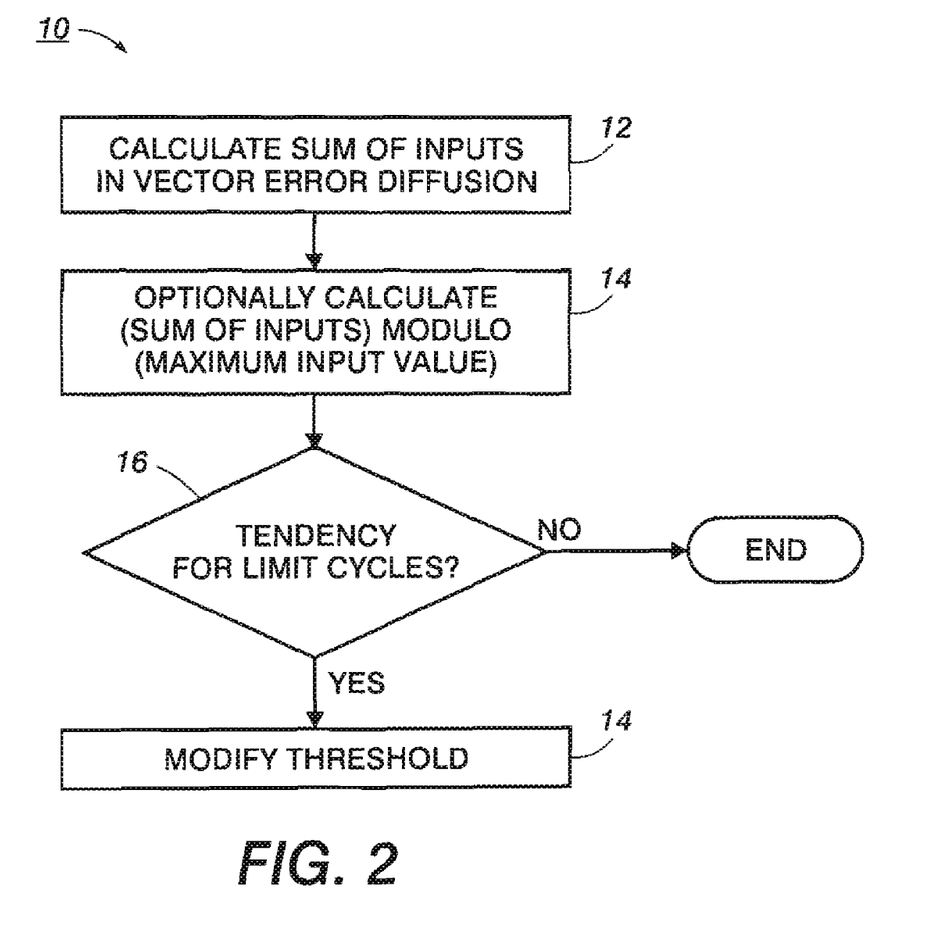
FIG. 2 illustrates a flowchart of an exemplary method of threshold modification for limit cycle removal in vector error diffusion.

FIG. 2 shows an exemplary method 10 of threshold modification for limit cycle removal in vector error diffusion. A sum of inputs in vector error diffusion is calculated at 12. Optionally, the value of the sum is calculated modulo one more than the maximum input value (e.g., 256) at 14. It is determined at 16 whether the mod value is one with a tendency for limit cycles and, if so, the threshold is modified at 18. Often there is a tendency for limit cycles when the sum or the mod value is at or near fractional values (e.g., ½, ⅓, ¼, ¾, ⅔, ¾, etc.) of a maximum input value (e.g., 255).

A vector is an array representing colors. In scalar error diffusion or halftoning, evaluating a pixel means operating separately on each of the different colors for that pixel. By contrast, in vector error diffusion, colors are evaluated at the same time, for example, to decide what to print and what not to print. The vector refers to the different color planes, e.g., in a display device, red (R), green (G) and blue (B) or in a printing device, cyan (C), magenta (M), yellow (Y) and black (K). For any pixel in an image, the vector stores information for each of the different colors. Yellow often is not used in vector error diffusion calculations because it is hard to see yellow. U.S. Pat. No. 6,014,233 to Fan et al. describes leaving out yellow in vector calculations.

Error diffusion distributes an error associated with each decision to print a dot or ink drop at a particular location for a pixel to neighboring pixels. In this way, each time a decision is made for a pixel, the current decision is influenced by past decisions and the associated error.

The threshold is modified for those input levels where the sum of the inputs considered together in the vector calculation (e.g., C, M and K) represents an input likely to produce limit cycles. The tendency of the mod value to produce limit cycles is determined for all the planes in a manner similar to that for an individual plane. The threshold process for the vector calculation may then be modified to break up the cycles that occur in the combinations of the multiple colors. Typically, the largest of the individual plane modifications and the vector mod values is used for threshold modification.

At least two different types of threshold modification are possible: (1) random or pseudo-random noise added to the threshold; and (2) non-contiguous regions of threshold (e.g., deterministic bit flipping). For the first type of thresholding method, the threshold is changed by adding a random number and the potential size of that random number is varied depending on the likelihood for artifacts. Where there are significant artifacts, the range of random numbers is increased. For the second type of thresholding method, the range of the non-contiguous regions used for the thresholding depends on the input and those ranges are increased in size as the tendency for artifacts increases. Regardless of the type of threshold modification, a modification is made to the thresholding process that is dependent on the sum of the inputs. The modification may be calculated each time or a lookup table may be used. Optionally, the sum modulo a maximum input value is used to determine the size of the threshold modification. The lookup can be done without the modulo function if a large input range is allowed, but the modulo function saves storage space. Then, either of the following methods can be used in the vector calculation: (1) the maximum modification is chosen from among the primary colors and the vector sum or (2) the sums of the modifications is used.

Figure 3:
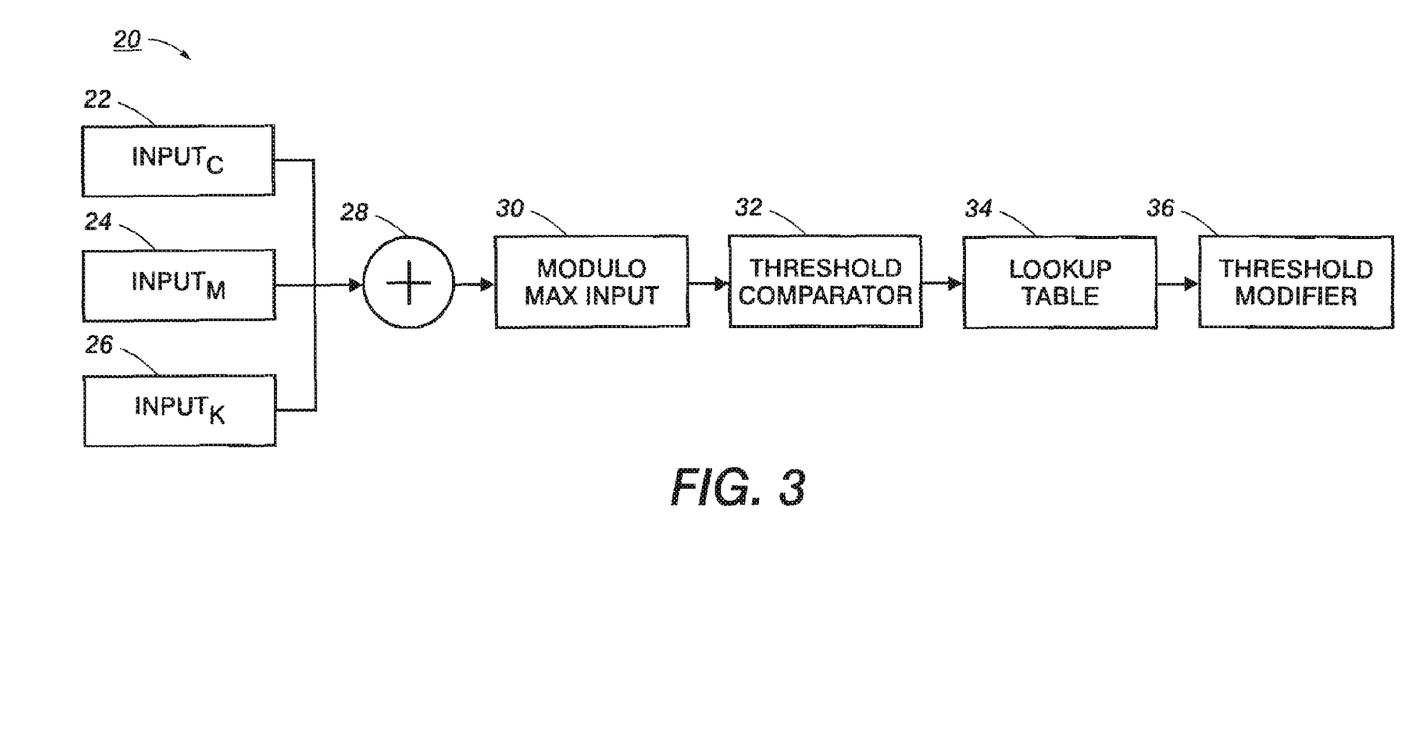
FIG. 3 illustrates a block diagram of an exemplary embodiment of a portion of a vector error diffusion circuit for performing threshold modification for limit cycle removal.

FIG. 3 shows an exemplary embodiment of a portion 20 of a vector error diffusion circuit for performing threshold modification for limit cycle removal. The portion 20 includes an input for C 22, an input for M 24 and an input for K 26, an adder 28, and a modulo component 30 to calculate the sum modulo the maximum input value (e.g., 256). The mod value is evaluated for its tendency to produce limit cycles in the threshold comparator 32. If there is a tendency to produce limit cycles, a lookup table 34 is used and the threshold modifier 36 modifies the thresholding accordingly.

Figure 4:
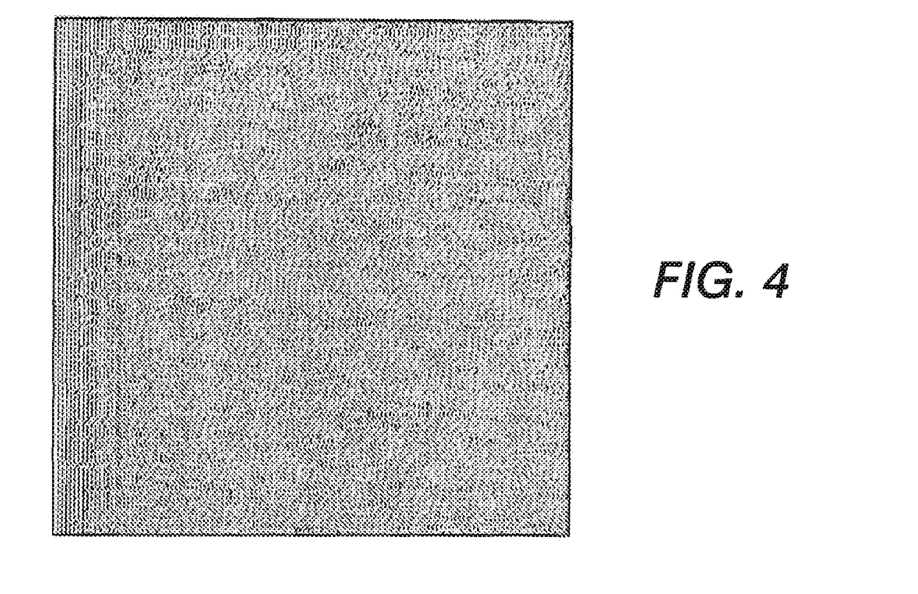
FIG. 4 illustrates an exemplary color output image having large areas of alternating patterns.

FIG. 4 shows an exemplary color output image having large areas of alternating patterns. This is the output of a vector error diffusion calculation for inputs C=M=K=42. Normally, noise is not added at these individual levels. However, the sum of these levels is 126 and in the vector calculation that may create limit cycles just like a primary color would at that same input. FIG. 4 is converted to black and white in FIG. 5 to make it easier to see the striped, non-uniform areas, which are artifacts to be reduced, corrected, or eliminated.

Figure 5:
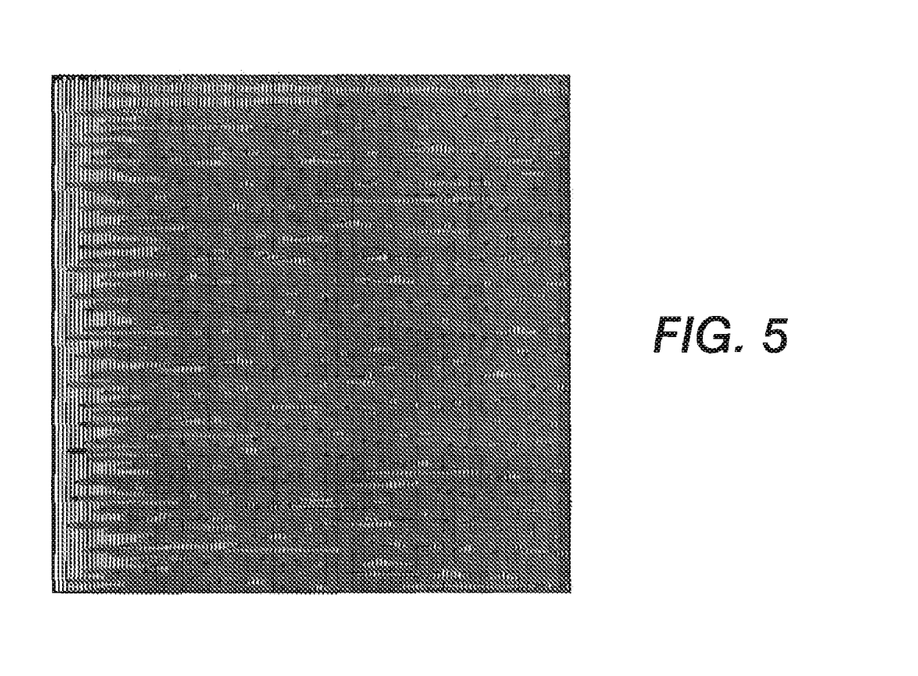
FIG. 5 illustrates a black and white representation of the color output image of FIG. 4 to more fully illustrate the alternating patterns.

FIG. 5 shows a black and white representation of the color output image of FIG. 4 to better illustrate the alternating patterns. All the pixels in the image of FIG. 4 were converted to black to make it easier to see the vector limit cycle correlation. FIG. 5 illustrates the striped nature and little dark points. FIG. 5 is at a level where approximately half the dots are black and half the rest are white. (In FIG. 4 half of the pixels are colored and half are not colored.

In a fractional or near fractional level (e.g., ½, ⅓, ¼, etc.) such as the near 50 percent pattern (i.e., 126/255=0.49), illustrated in FIG. 5, patterns are repeated that could be stable or very close to stable. In FIG. 5, there are two stable patterns, which in and of themselves would be good representations of the near 50 percent pattern. The first pattern is a checkerboard pattern and the second pattern is vertical lines that alternate between black and white. In the error diffuser, these locally stable patterns alternate. The error diffuser produces one pattern until enough error accumulates to shift the pattern from checkerboard to vertical lines or vice-versa. Dark spots sometimes mark transitions between the checkerboard and vertical lines patterns. The two visually different patterns in FIG. 5, over broad regions of the image, create noticeable textures in areas that are supposed to be uniform, especially in enlarged images such as FIG. 5.

While vector limit cycles are less noticeable than primary color limit cycles, vector limit cycles can create image artifacts in much the same manner. This can be broken up in a similar manner as is done for primary colors, by modifying the threshold process to randomly or pseudo-randomly break up the repeatability of the pattern. Typically, noise is added to the threshold or, equivalently, noise is added to the modified input. In the vector case, noise is added to the vector threshold or, equivalently, to the sum of the modified inputs.

Figure 6:
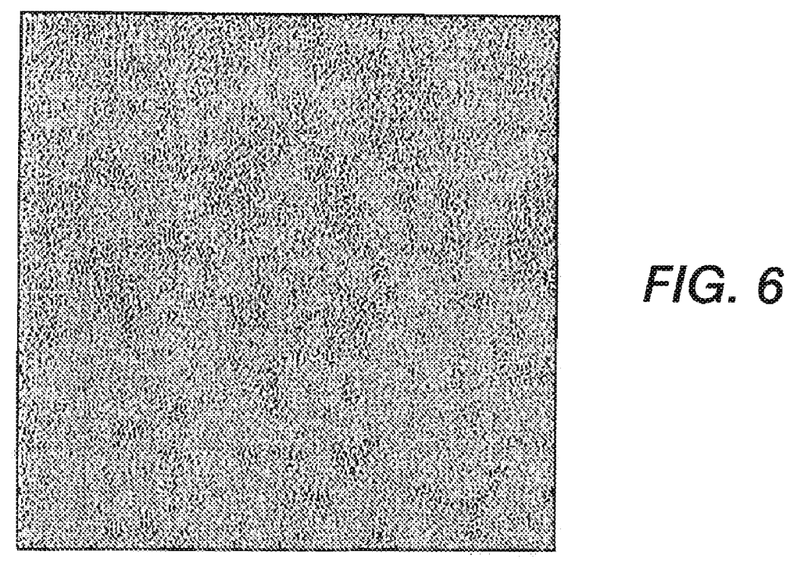
FIG. 6 illustrates the resulting color output image after applying threshold modification for limit cycle removal in vector error diffusion to the image of FIG. 4.

FIG. 6 shows the resulting color output image after applying threshold modification for limit cycle removal in vector error diffusion to the image of FIG. 4. In FIG. 6, the patterns are broken up in a random way. There may still be small regions where there is a checkerboard or vertical lines, but the regions are small enough that the artifacts are not easily detectable visually. A desired degree of randomness may be determined empirically, varying, for example, depending on the nature of the image being printed or how an image was created.

Figure 7:
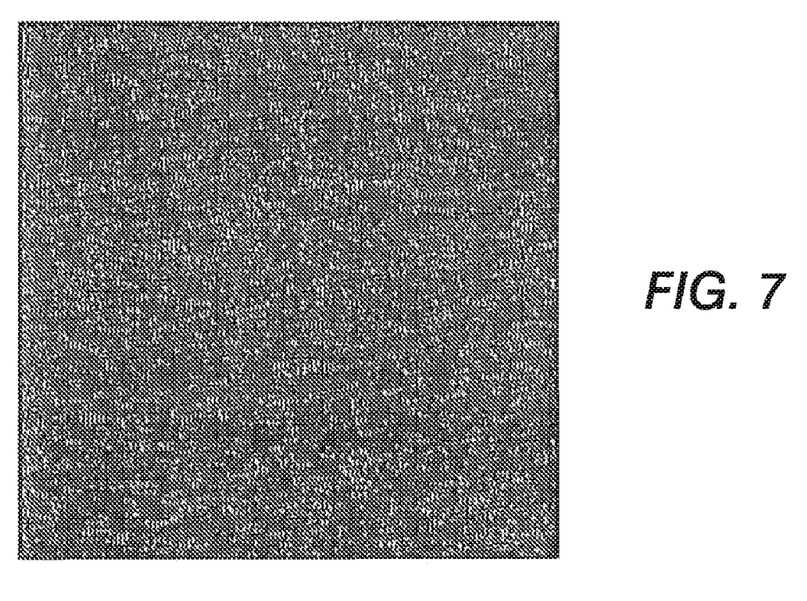
FIG. 7 illustrates a black and white representation of the resulting color output image of FIG. 6 to better illustrate the results.

FIG. 7 shows a black and white representation of the resulting color output image of FIG. 6 to better illustrate the results.

The threshold modification for limit cycle removal in vector error diffusion may use a noise profile similar to that used for primary colors. In that case, a lookup table may be provided with the amount of noise that depends on the input image 0-255. This typically has peaks at values 128 (limit cycle at ½), 64 (limit cycle at ¼), 191 (limit cycle at ¾), 85 (limit cycle at ⅓), and 170 (limit cycle at ⅔). However, the sum can take on values much greater than 255. This can cause limit cycles as well.

Figure 8:
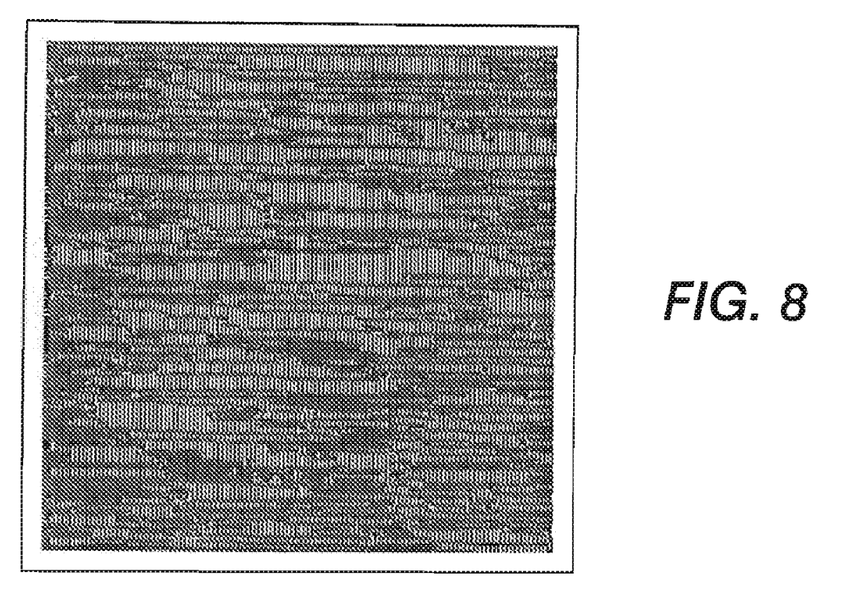
FIG. 8 illustrates a black and white representation of another exemplary color output image having large areas of alternating patterns.

FIG. 8 shows a black and white representation of another exemplary color output image having large areas of alternating patterns. FIG. 8 comes from an input C=176, M=176 and K=176. The sum is equal to 382, which equals 255+127. Any pixel with one drop has been converted to black and any pixel with two drops has been converted to white. In this example, there are no pixels with either 0 or 3 drops.

Figure 9:
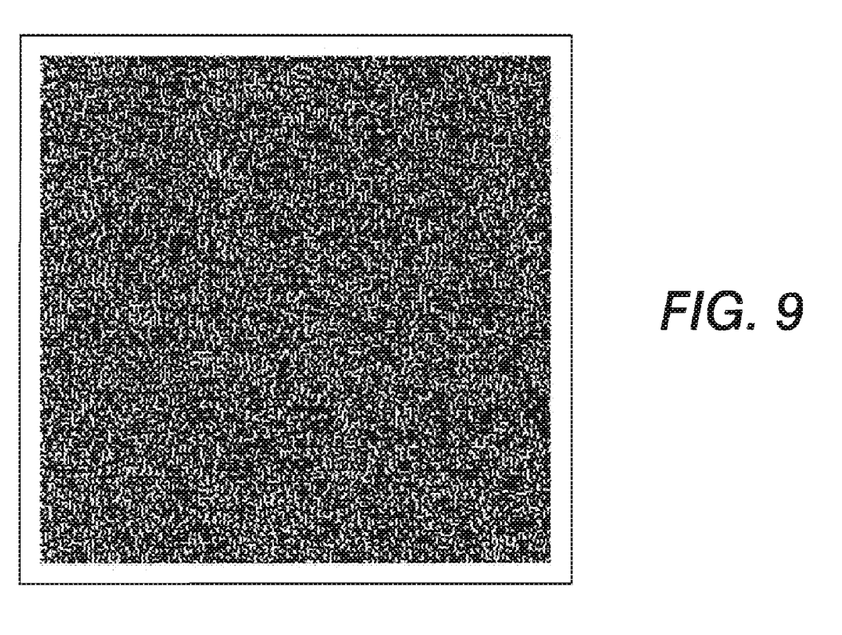
FIG. 9 illustrates a black and white representation of another resulting color output image after applying threshold modification for limit cycle removal in vector error diffusion to the image of FIG. 8.

FIG. 9 shows a black and white representation of another resulting color output image after applying threshold modification for limit cycle removal in vector error diffusion to the image of FIG. 8. To break up the pattern in FIG. 8, the noise term is calculated not from the sum of the colors, but from the sum mod 256. By using the modulo function, one table can be used to calculate the additional noise term for a large range of values. In this case, any primary noise terms are still added to the primary colors, but another option is to determine the maximum noise term between the primaries and the vector and use that in the calculation.

Figure 10:
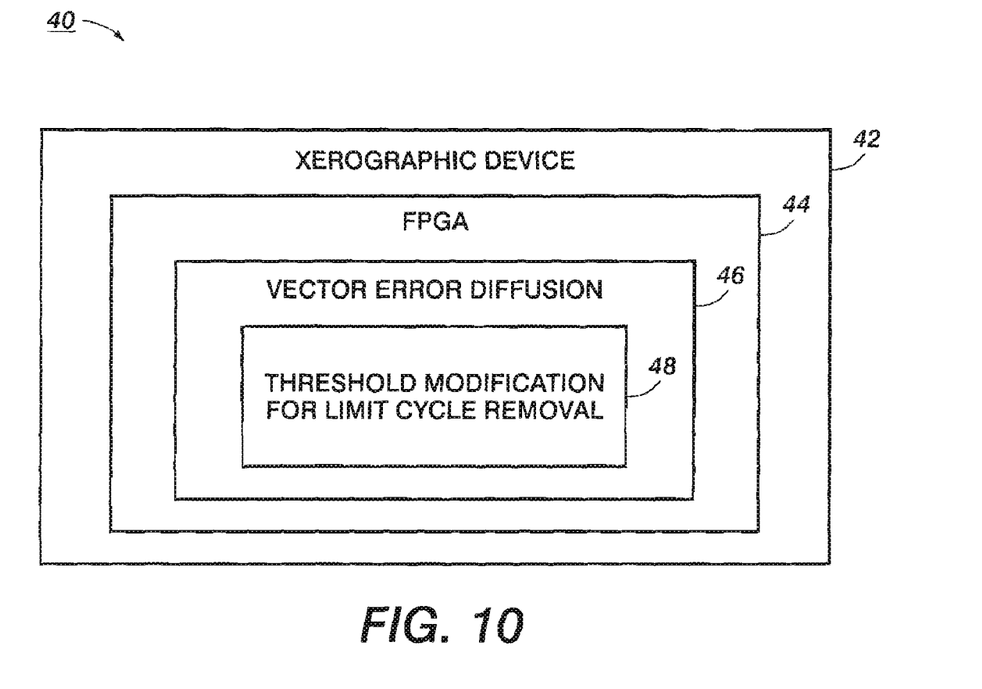
FIG. 10 illustrates a block diagram of an exemplary xerographic device having a field programmable gate array (FPGA) for storing instructions for performing a method of vector error diffusion including threshold modification for limit cycle removal.

FIG. 10 shows a system 40 including an exemplary xerographic device 42 having a field programmable gate array (FPGA) 44 for storing instructions for performing a method of vector error diffusion 46 including threshold modification for limit cycle removal 48. Exemplary embodiments of threshold modification for limit cycle removal in vector error diffusion may be implemented in hardware, software or firmware for any system, which may also include a network and additional computing devices, such as servers. Xerographic devices include printers, digital photocopiers, faxes, multi-purpose devices and the like. Exemplary embodiments of threshold modification for limit cycle removal in vector error diffusion may also be used in various fields, such as direct marking, xerography, displaying RGB (rather than CMYK) on a display, such as a monitor and others.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of vector error diffusion, comprising:
   calculating a sum of a plurality of inputs in vector error diffusion;
   determining whether the sum is at or near one of a set of fractions of a maximum input value tending to produce limit cycles; and
   modifying a thresholding to break up the limit cycles.

2. The method of claim 1, wherein the sum is calculated modulo the maximum input value.

3. The method of claim 1, wherein the threshold is modified using a largest of a plurality of individual plane modifications and the sum.

4. The method of claim 1, wherein the threshold is modified using a sum of a plurality of plane modifications.

5. The method of claim 1, wherein the threshold modification is adding random or pseudo-random noise.

6. The method of claim 1, wherein the threshold modification is made to ranges of output based on a sum of input levels.

7. The method of claim 6, wherein the thresholding is performed using deterministic bit flipping.

8. A marking device for performing vector error diffusion comprising:
   a memory for storing instructions;
   a calculating unit for calculating a sum of a plurality of inputs in vector error diffusion;
   a determining unit for determining whether the sum is at or near one of a set of fractions of a maximum input value tending to produce limit cycles; and
   a modification unit for modifying a thresholding to break up the limit cycles.

9. A vector error diffuser, comprising:
   an adder for calculating a sum of a plurality of inputs in vector error diffusion;
   a threshold comparator for determining whether the sum is at or near one of a set of fractions of a maximum input value tending to produce limit cycles; and
   a threshold modifier for modifying a threshold to break up the limit cycles.

10. The vector error diffuser of claim 9, further comprising a modulo function for calculating the sum modulo the maximum input value.

11. The vector error diffuser of claim 9, further comprising a lookup table to determine the threshold modification.

12. The vector error diffuser of claim 9, wherein the threshold is modified using a largest of a plurality of individual plane modifications and the sum.

13. The vector error diffuser of claim 9, wherein the threshold is modified using a sum of a plurality of plane modifications.

14. The vector error diffuser of claim 9, wherein the threshold modification is random or pseudo-random noise.

15. The vector error diffuser of claim 9, wherein the threshold modification is made to ranges of output that are mapped to specific output levels.

16. The vector error diffuser of claim 15, wherein the thresholding is performed using deterministic bit flipping.

17. A computer-readable medium for storing instructions for performing a method, the method comprising:
   calculating a sum of a plurality of inputs in vector error diffusion;
   determining whether the sum is at or near one of a set of fractions of a maximum input value tending to produce limit cycles; and
   modifying a threshold to break up the limit cycles.

18. The computer-readable medium of claim 17, wherein the sum is calculated modulo the maximum input value.

19. The computer-readable medium of claim 17, wherein the threshold is modified using a largest of a plurality of individual plane modifications and the sum.

20. The computer-readable medium of claim 17, wherein the threshold is modified using a sum of a plurality of plane modifications.

* * * * *